INVENTORS
JOSEPH A. VITKA
JAMES D. MURPHY

ATTORNEYS

United States Patent Office 3,613,264
Patented Oct. 19, 1971

---

3,613,264
WAVE CELL
Joseph A. Vitka, Winchester, and James D. Murphy, Framingham, Mass., assignors to Motionetics, Inc., Endicott, N.Y.
Filed Oct. 23, 1969, Ser. No. 868,871
Int. Cl. G09b 23/12
U.S. Cl. 35—19 R      7 Claims

ABSTRACT OF THE DISCLOSURE

A wave cell, in which plural non-miscible liquids display fluidic wave motion, employs light mineral oil as a principal constituent of a first liquid and employs water as a principal constituent of a second liquid, with a minor portion of a fluorinated hydrocarbon in the first liquid and preferably with a minor portion of alcohol in the second liquid. The optional addition of a low-foaming surfactant enhances the displayed wave motions. An optically transparent acrylic resin tube closed with acrylic resin end caps forms the wave cell chamber, and an air trap at one end of the tube accommodates thermal expansion and contraction without unduly stressing the vessel.

BACKGROUND

This invention relates to a wave cell having an optically transparent vessel containing at least two non-miscible liquids that move with fluidic wave motion as the vessel is rocked or otherwise moved. In particular, the invention provides a wave cell that provides a superior display of wave motion without presenting safety hazards. That is, the wave cell is safe in terms of minimal fire danger and minimal danger of toxic injury, especially from the liquids, and it has a minimal likelihood of liquid leakage.

Wave cells of the present type have been known and used, for example, in studying wave motion. In addition, wave cells are decorative and amusingly entertaining to manipulate and observe.

However, a wave cell provides a fast-moving, lively and sensitive display of wave motion only when the liquids in it are matched to each other in terms of specific gravity, surface tension optical index of refraction, viscosity, and optical transmission. The selection of a combination of liquids to satisfy these oft-times diverse requirements is further complicated by the requirement that the liquids be safe for general use anywhere from in a laboratory to in a home, and for handling by children or businessmen.

In fact, prior wave cells have generally been unsafe because the liquids considered necessary for an optimum display of fluid motion have been relatively flammable, toxic, and difficult to contain. With these shortcomings, the shipment of prior wave cells has been costly, and their display and use has presented a considerable hazard. Hence, wave cells have generally had limited use, and then principally only for scientific purposes.

Accordingly, it is an object of the present invention to provide a wave cell that is safe for use as an article of commerce.

A further object is to provide a safe wave cell that provides an essentially optimal display of wave motion.

A more particularly object is to provide a wave cell that is aesthetically pleasing to observe and yet is of strong and durable construction with non-flammable and non-toxic materials.

A further object of the invention is to provide a combination of liquids that exhibit visually striking wave motion in a wave cell and which are relatively inflammable and non-toxic. It is also an object to provide such a combination of liquids that is readily contained, i.e. that does not deteriorate container materials, particularly optically transparent container materials.

It is also an object of the invention to provide a wave cell chamber having materials and construction that safely contain the wave cell liquids and yet provide undistorted observation of the movement of the liquids.

Other objects of the invention will in part be obvious and will in part appear hereinafter.

SUMMARY OF THE INVENTION

It has now been found that there are liquids safe to handle which provide a wave cell of superior operation. One liquid according to the invention is simply water with a small amount of alcohol. The other liquid is light mineral oil with a small amount of fluorinated hydrocarbon of the type commercially available under the trademark Freon.

These liquids are relatively inflammable and non-toxic. Further they do not deteriorate readily available container materials and hence can be contained readily in a strong but low cost chamber. Moreover, these liquids have the fluid properties required for a lively, agitated display of differential fluid flows.

It has further been found that the provision of a trace amount of a non-sudsing surfacant in a wave cell chamber enhances the visual wave motion display which the cell produces.

The invention also provides a new construction for a wave cell chamber in which an extruded, optically transparent, hollow acryic resin tube is sealed at the ends with telescopically fitting end caps, preferably also of acrylic resin. Further, the new construction has an air trap on the inside of one end cap. Air remaining in the chamber after it is filled and sealed is readily gathered into the trap so that the cell operates with no air visible. Also, the trapped air readily accommodates thermal contraction and expansion of the chamber and of the liquids.

The invention accordingly comprises the features of construction, combination of elements and arrangement of parts exemplified in the construction hereinafter set forth, and the scope of the invention is indicated in the claims.

BRIEF DESCRIPTION OF THE DRAWINGS

For a fuller understanding of the nature and objects of the invention, reference should be had to the following detailed description taken in connection with the accompanying drawings, in which.

DESCRIPTION OF ILLUSTRATED EMBODIMENTS

Figure 3:
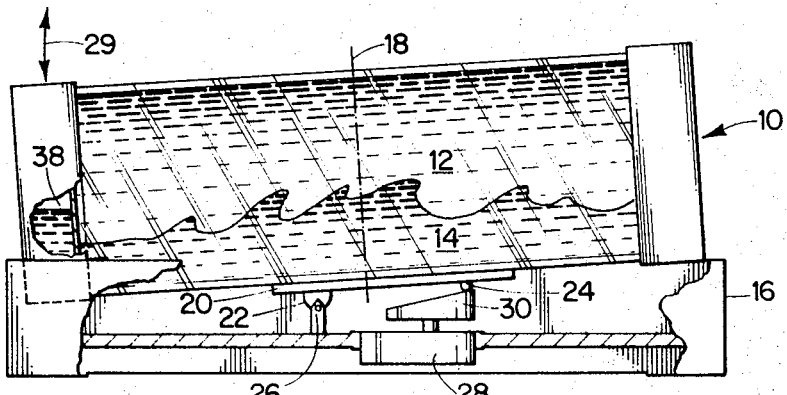
FIG. 3 is a front elevation view, partly broken away, of a wave cell employing the chamber of FIG. 1 mounted on a base with a rocking-drive motor in accordance with the invention.

Turning first to FIG. 3, it shows a wave cell constructed in accordance with the invention with a chamber 10 containing liquids 12 and 14 and mounted on a base 16. The chamber, an elongated hollow tube with sealed ends, is symmetrical about a centre line 18. A support plate 20 on the outside bottom of the chamber 10 has a pivot socket 22 offset to the left in FIG. 3 from the center line 18 and has a cam follower 24 offset to the right of the center line 18.

The base 16 forms a shallow well for receiving the chamber 10 and has a pivot 26 extending upward in the well to seat in the pivot socket 22. In addition, a motor 28 is mounted in the base to rotate a shaft-mounted cam plate 30 under the cam follower 24. With this arrangement, as the rotation of the motor turns the cam plate under the cam follower 24, the wave cell chamber 10 is rocked about the engagement of the pivot 26 in the pivot socket 22 with a rocking movement that moves the right and left ends of the chamber 10 as seen in FIG. 3 alternately up and down. This movement, indicated with arrow 29, causes the liquids 12 and 14 to undergo wave motions creating at their interface a dynamic wave pattern such as is illustrated in FIG. 3. Where desired, the motor-cam-pivot arrangement can be adjustable to change either or both the speed and the amplitude of the rocking motion to produce different wave patterns.

Further in accordance with the invention, the liquids 12 and 14 in the wave cells are principally mineral oil and water respectively. These liquids present essentially no fire, toxicity or other safety hazard. However, their densities are considered too disparate for optimum wave motion, with water being too heavy relative to the mineral oil, so that the wave motion is faster than desired.

The invention further solves this problem without introducing a significant safety hazard by providing a relatively small amount of a fluorochloromethane or a fluorochloroethane in the mineral oil, and by providing a relatively small amount of alcohol in the water.

Thus the liquid 12 is a mixture of mineral oil and such a fluorinated hydrocarbon. These hydrocarbons are commercially available under the trade designation "Freon." The mineral oil in the liquid 12 preferably is a light oil with a so-called white color, i.e. it is crystal clear. Moreover, it is generally desired that the mineral oil have a stable non-yellowing color even when exposed to sunlight. One suitable light mineral oil is commercially available from the Pennsylvania Refining Company under the name "Penetek."

The introduction of Freon to the liquid 12 increases the density over that of the mineral oil alone. This brings the density of liquid 12 closer to the density of the alcohol-water mixture of liquid 14. Typically, the liquid 12 consists of about zero to ten percent, by volume, of Freon, with the balance being light mineral oil; seven to eight percent by volume of Freon is considered preferable. Also, a preferred Freon is trichlorotrifluoroethane, available under the tradename designation "Freon-113."

With regard to the liquid 14, the addition of alcohol to the water reduces the density of the liquid, thereby bringing it closer to that of oil-Freon mixture of liquid 12. The alcohol is generally present in an amount between about zero and fifteen percent by volume with the balance being water; an alcohol content between around thirteen percent by volume is generally preferred. Ethyl alcohol is usually preferred, although other forms are satisfactory. Where desired, one or both of the liquids 12 and 14 can be colored, in one illustrative instance the liquid 12 is left clear and food coloring is added to the liquid 14.

With these liquids 12 and 14, the wave cell as shown in FIG. 3 provides dynamic wave patterns of striking appearance as the chamber 10 is moved. The two liquids have the proper match of specific gravities, viscosities, and other properties for lively wave action. Further, their indexes of refraction are such that the interface between the two liquids is visibly distinct.

As noted above, it has further now been found that the introduction of a surfactant, i.e. a surface active agent, to the liquids 12 and 14 reduces the interfacial surface tension between them to enhance the display of wave action which the cell generates. It is usually desirable to use a low-foaming surfactant so that no significant sudsing occurs within the chamber of the wave cell. Further, only a trace amount, e.g. a small drop into a quart-size chamber, of surfactant is generally ample.

Figure 1:
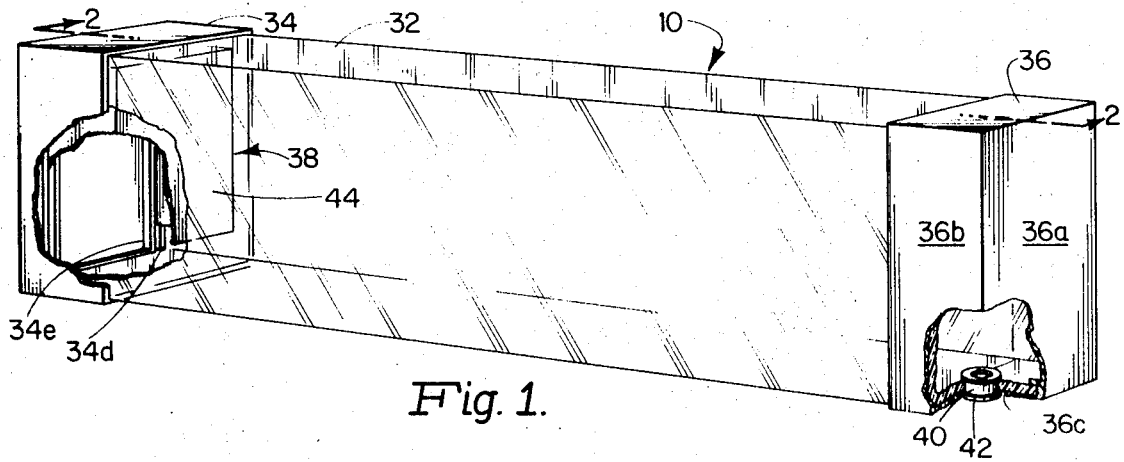
FIG. 1 is a perspective view, partly broken away, of a wave cell chamber embodying the invention.
Figure 2:
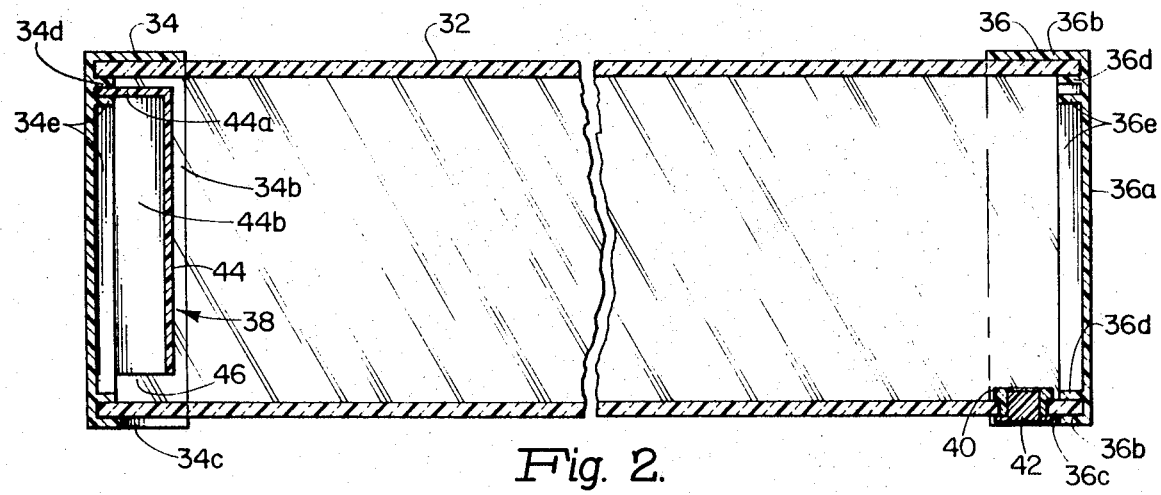
FIG. 2 is a side elevation cross-sectional view of the wave cell chamber of FIG. 1 taken along line 2—2.

Turning now to FIGS. 1 and 2, the wave cell chamber 10 is constructed with an optically transparent hollow tube 32 having open ends that are sealed closed with optically opaque end caps 34 and 36. An air trap 38 inside the chamber at the left end contains the air remaining in the chamber after it is filled with the liquids 12 and 14 in order to provide a bubble-free display. Further the trapped air accommodates thermal expansion and contraction, particularly of the liquids 12 and 14, to minimize thermal stresses in the chamber 10. Accordingly, air is left in the chamber intentionally.

The tube 32 has a rectangular cross-section to provide flat surfaces for viewing the wave motion of the liquids 12 and 14 with minimal optical distortion. The tube is preferably extruded or otherwise formed to have a seamless structure to minimize the likelihood of leakage. The illustrated tube is of acrylic resin, methylmethacrylate is preferred because of its high resistance to deterioration by the liquids 12 and 14, as well as by liquids that may accidentally be spilled on the chamber by users. Adjacent the bottom right end of the chamber 10, the tube is fitted with a plug adaptor 40 that provides a sealable opening for filling the chamber. A plug 42 is sealed in the adaptor, preferably with acrylic-sealing adhesive, after the chamber is filled with the liquids 12 and 14.

The end caps 34 and 36, and the adaptor 40 and plug 42, all are preferably of acrylic resin similar to the tube 32 material. Opaque resin is often desired for the end caps.

The end cap 36 has an end panel 36a spanning the open tube end, and an outer wall 36b peripherally thereabout that telescopically fits over the tube. The outer wall extends along the tube beyond the adaptor 40 so that the adaptor is not readily visible. The bottom panel of the wall 36b is cut away to provide a slot-like recess 36c to allow the cap to be slid onto the tube around the adaptor.

A sealing ridge 36d on the inside of the end panel 36a follows a closed rectangular path to form, with the outer wall 36b, a sealing recess into which the tube 32 fits. This provides a three-sided closed labyrinth seal between the cap 36 and the tube 32. A resilient cement, such as a silicone rubber-base cement, can be used to join the end cap to the tube with a secure, shock-proof fluid-tight seal.

The illustrated cap 34 is exactly identical to the cap 36 and in addition has a trap-forming enclosure 44 fastened to it. The enclosure preferably is sealed to the end cap with a three-sided seal formed on the inner side of the cap end panel 34a between the sealing ridge 34d and another sealing ridge 34e. The ridge 34e follows a three-sided U-shaped path. The cap 36 is illustrated as having a like path 36e so that the end caps are interchangeable.

The enclosure 44, also preferably of methylmethacrylate, is shaped generally as a scoop with a top wall 44a, side walls 44b—44b and a back wall 44c. The edges of the top and side walls are seated and sealed within the sealing recess formed inside the end cap panel 34a to form the air trap 38 with only a single opening 46 facing downward within the chamber 10. The opening 46 is at the extreme longitudinal end of the chamber 10 and spans essentially across the full width of the chamber; the top and side enclosure walls are spaced from the chamber tube 32 only by the small thickness of the sealing ridge 34d. Further, the enclosure 44 has considerable height between the top wall 44a and the opening 46 at the other end of the enclosure. This height ensures that the trap 38 can contain considerable volume of air without it bubbling out when the wave cell is rocked or otherwise tipped through a relatively large angle.

With the foregoing construction for the wave cell chamber 10, after the chamber is filled with the liquids 12 and 14, the air remaining in the chamber is gathered into the trap 38 by holding the chamber essentially on end with the trap opening 46 uppermost. The chamber then is rotated so that the air which collects in front of the trap opening is forced upward into the trapped interior.

In summary, the present invention provides a wave cell that is essentially free of safety hazards and yet exhibits a superior display of wave motion. The cell employs liquids that present essentially minimal fire hazard, and that have low toxicity should they accidentally be spilled or even swallowed. Moreover, the liquids have the optical and other physical properties for lively fast flow. Nevertheless, the liquids are low in cost and consist of readily available constitutents.

Further, the invention provides a strong, durable and shock-free wave cell chamber that is readily manufactured at relatively low cost and yet with attractive appearance. The wave cell chamber incorporates an air trap for enhanced performance and safety. Also, the wave cell can be automatically rocked to provide a continuing display of wave action. In addition, the fluid filled chamber can be lifted from the motorized base for manual operation.

It will thus be seen that the object set forth above, among those made apparent from the preceding description, are efficiently attained. Since certain changes may be made in the above constructions without departing from the scope of the invention, all matter contained in the above description or shown in the accompanying drawings shall be interpreted as illustrative within the spirit of the invention.

Having described the invention, what is claimed as new and secured by Letters Patent is:

1. A wave cell having a fluid-tight chamber and further comprising in said chamber:
   (a) a first liquid consisting essentially of light mineral oil and fluorinated hydrocarbon selected from fluorochloromethane and fluorochloroethane, with said hydrocarbon constituting around seven to eight percent by volume of said first liquid with said oil constituting the balance thereof,
   (b) a second liquid consisting essentially of water and alcohol, with said alcohol constituting around ten to fifteen percent by volume of said second liquid with water constituting the balance thereof, and
   (c) a trace amount of low-foaming surfactant.

2. A wave cell having a closed chamber containing at least two liquids that are normally disposed one above the other and then move to display fluidic wave motion, said chamber comprising:
   enclosure means having an opening into the interior thereof and forming within said chamber interior a compartment for containing air sealed from said liquids except through said opening which is in fluid communication with the interior of said chamber, said enclosure means being arranged to dispose said opening at an end of said chamber such that air sealed in said chamber with said liquids passes into said compartment as said chamber is moved from a disposition that places said opening uppermost to a position where the interior of said compartment is uppermost.

3. A wave cell as defined in claim 2
   (a) in which said chamber further comprises
      (1) an elongated hollow transparent tube having first and second opposed ends, and
      (2) first and second closure means closing said tube at said ends, and
   (b) in which said enclosure means is disposed within said tube at one end thereof and forms said air compartment open to the interior of said tube only at an end of said compartment facing in a direction transverse to the direction in which said tube is elongated, said enclosure means being further arranged to project said opening at an extreme end of said tube and substantially across the tube dimension thereat transverse both to the direction in which said opening faces and to the direction in which said tube is elongated.

4. A wave cell as defined in claim 3
   (a) in which said tube and said closure means and said enclosure means are of acrylic resin material, and
   (b) in which a first liquid in said chamber consists essentially of a major portion by volume of water and a minor portion by volume of alcohol; and
   (c) in which a second liquid in said chamber consists essentially of a major portion of volume of light mineral oil and a minor portion by volume of fluorinated hydrocarbon selected from fluorochloromethanes and fluorochloroethanes.

5. A wave cell as defined in claim 3 in which each said closure means is an acrylic resin end cap telescopically fitting over the same-numbered tube end and having an inner ridge telescopically fitting within said tube end, thereby to form a three-sided recess continually along a closed path into which said tube end is seated.

6. A wave cell as defined in claim 2 further comprising:
   (a) support means pivotally supporting said chamber for rocking motion wherein opposed chamber ends alternately move up and down; and
   (b) motor means mounted on said support means for imparting said rocking movement to said chamber.

7. A wave cell having a fluid-tight chamber and further comprising in said chamber:
   (a) a first liquid consisting essentially of light mineral oil and fluorinated hydrocarbon selected from fluorochloromethane and fluorochloroethane, with said hydrocarbon constituting around seven to eight percent by volume of said first liquid with said oil constituting the balance thereof, and
   (b) a second liquid consisting essentially of water and alcohol, with said alcohol consisting around ten to fifteen percent by volume of said second liquid with water constituting the balance thereof.

References Cited

UNITED STATES PATENTS

| 2,394,093 | 2/1946 | Nalle | 35—19 X |
|---|---|---|---|
| 2,569,078 | 9/1951 | Silver | 40—106.21 |
| 2,714,260 | 8/1955 | Burckhardt | 35—19 |
| 3,387,396 | 6/1968 | Smith | 40—106.21 |
| 3,475,834 | 11/1969 | Bugg | 35—19 |

HARLAND S. SKOGQUIST, Primary Examiner

U.S. Cl. X.R.

40—106.21; 272—8 R

UNITED STATES PATENT OFFICE
CERTIFICATE OF CORRECTION

Patent No. 3,613,264            Dated October 19, 1971

Inventor(s) Joseph A. Vitka and James D. Murphy

It is certified that error appears in the above-identified patent and that said Letters Patent are hereby corrected as shown below:

Column 2, line 25, "surfacant" should be changed to --surfactant--.

Column 5, line 4, "constitutents" should be changed to --constituents--.

Column 6, line 42, "consisting" should be changed to --constituting--.

Signed and sealed this 18th day of April 1972.

(SEAL)
Attest:

EDWARD M. FLETCHER, JR.
Attesting Officer

ROBERT GOTTSCHALK
Commissioner of Patents